Jan. 30, 1923.

W. NAIL.
NUT LOCK.
FILED SEPT. 14, 1920.

1,443,427.

Inventor
W. Nail.

By Geo. P. Kimmel
Attorney

Patented Jan. 30, 1923.

1,443,427

UNITED STATES PATENT OFFICE.

WALTER NAIL, OF NEWARK, NEW JERSEY.

NUT LOCK.

Application filed September 14, 1920. Serial No. 410,095.

*To all whom it may concern:*

Be it known that I, WALTER NAIL, a citizen of the United States, residing at Newark, in the county of Essex and State of New Jersey, have invented certain new and useful Improvements in a Nut Lock, of which the following is a specification.

My invention relates to nut locks and comprises a locking device located in a groove or chamber formed in the side of the screw bolt, being in contact with the threads of the nut while the latter is being screwed onto the bolt, and turned by frictional contact with said threads into positive locking engagement when the nut is turned in the opposite direction, to prevent unscrewing.

Figure 1:
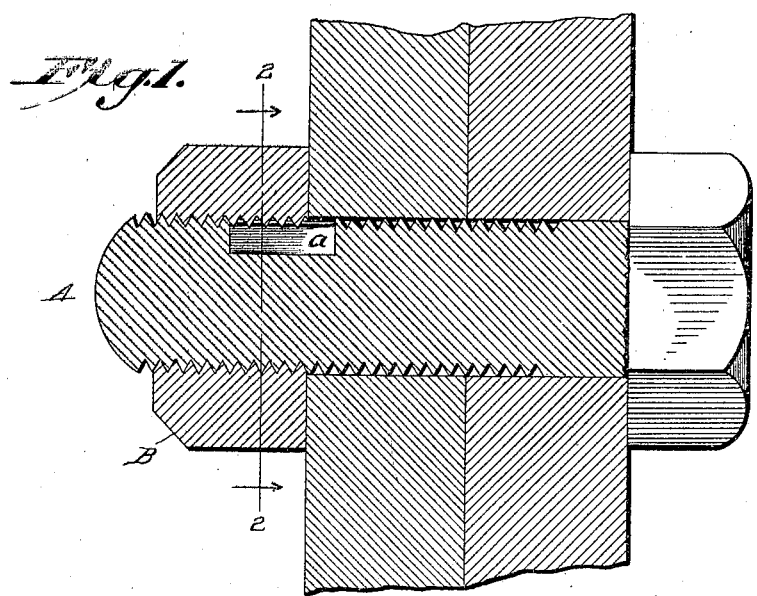
Figure 2:
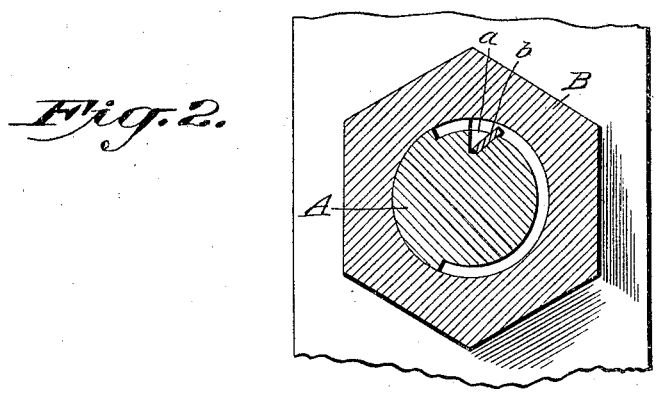

In the accompanying drawing, which illustrates my invention,

Figure 1 is a longitudinal section through the body portion of a screw bolt having a nut thereon, also in section, and showing two bodies clamped together, and, Fig. 2 is a section on the line 2—2.

Referring to the drawing, A designates an ordinary screw bolt and B a nut screwed thereon. In the body of the bolt, in the side thereof, I form an angle-shaped groove $a$, one side of which is radial relative to the axis of the bolt and the other inclined outwardly from the bottom, as shown in Fig. 2, the inclined side being the side towards which the nut is turned in screwing it onto the bolt. The groove $a$ is of the same depth throughout and is positioned intermediate the ends of the threaded portion of the bolt.

In the groove $a$ I place a metal plate $b$ slightly shorter than the groove, so as to work freely therein, of a width to contact with the threads of the nut as it is being screwed on, and of metal harder than the nut. The plate $b$ is of the same thickness throughout and has each of its edges square.

The plate $b$ being in place in the groove $a$, when the nut is screwed on the threads thereof will engage the edge of the plate and turn, and hold it in the position shown in Fig. 2. If the nut be now turned backward to unscrew it the threads will, by frictional engagement, turn the plate on its inner edge, causing the outer edge to be projected and pressed into the threads of the nut to prevent removal.

The plates $b$ may be cut from sheet metal and the groove formed in the bolt with an ordinary cutter, and it will be seen that an efficient nut lock is thus provided at moderate expense, which is one of the objects I have sought to attain.

Having thus described my invention, I claim:

A nut lock comprising a threaded bolt having an angle-shaped groove formed intermediate the ends of the threaded end portion thereof, one side wall of the groove being radial relative to the axis of the bolt and the other side wall inclined outwardly from the bottom of the groove and with respect to the other side wall thereof, said groove being of the same depth throughout and a flat metal rectangular plate loosely disposed within said groove and of a width to frictionally contact the base of the threads of the nut, when abutting the inclined side wall thereof, and to be turned, by such frictional contact with the base of the threads of the nut, toward the radially disposed side wall of the groove and into locking engagement with the latter, said plate of the same thickness throughout and having each of its edges squared.

In testimony whereof, I affix my signature hereto.

WALTER NAIL.